United States Patent [19]
Pankoke

[11] 4,365,548
[45] Dec. 28, 1982

[54] PRESSURE APPLICATION APPARATUS

[75] Inventor: Werner Pankoke, Bielefeld, Fed. Rep. of Germany

[73] Assignee: Firma Theodor Hymmen KG, Bielefeld, Fed. Rep. of Germany

[21] Appl. No.: 187,559

[22] Filed: Sep. 15, 1980

[30] Foreign Application Priority Data

Sep. 20, 1979 [DE] Fed. Rep. of Germany ....... 2937972

[51] Int. Cl.³ .............................................. B30B 5/06
[52] U.S. Cl. .................................. 100/154; 425/371; 425/405 R; 156/583.5
[58] Field of Search ............... 100/118, 151, 152, 153, 100/154, 93 RP; 156/555, 582, 583.1, 583.5; 425/371, 405 R

[56] References Cited

U.S. PATENT DOCUMENTS

| | | | |
|---|---|---|---|
| 2,135,763 | 11/1938 | Nicholson | 100/151 X |
| 3,340,795 | 9/1967 | Hartley | 100/154 |
| 3,587,451 | 6/1971 | Luthi | 100/154 X |
| 3,748,225 | 7/1973 | Busker et al. | 100/154 X |
| 3,970,515 | 7/1976 | Busker | 100/151 |
| 4,025,272 | 5/1977 | Camp | 425/405 R X |
| 4,053,276 | 10/1977 | Ahrweiler et al. | 425/371 X |
| 4,193,342 | 3/1980 | Held | 100/154 |

FOREIGN PATENT DOCUMENTS 2114736 3/1971 Fed. Rep. of Germany ...... 100/154

Primary Examiner—Peter Feldman
Attorney, Agent, or Firm—Head, Johnson & Stevenson

[57] ABSTRACT

In an apparatus for applying a surface pressure to progressive moving workpieces comprising at least one rotating pressure belt having a workpiece carrying surface and an opposed surface and means for applying pressure to said belt to cause said belt to apply pressure to said workpiece, said pressure application means comprising a sealing strip in sealing abutment with said opposed surface of said belt, said sealing strip together with said belt forming part of a pressure chamber into which a pressure medium is induced the improvement comprising the provision of a plurality of pressure chambers over the length and width of said belt in its workpiece carrying region.

10 Claims, 11 Drawing Figures

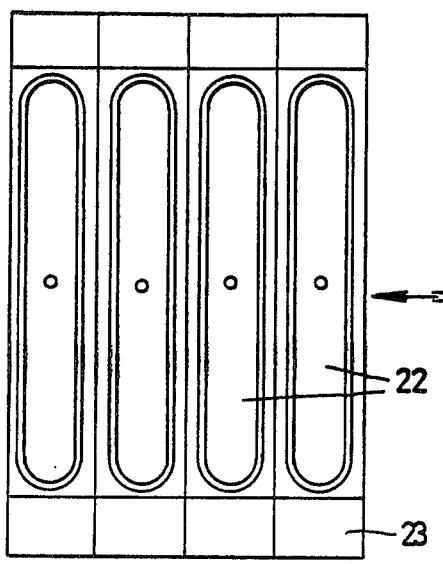
Fig. 4
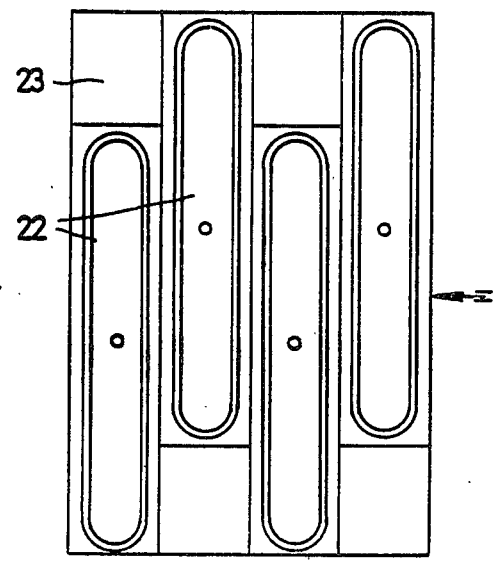
Fig. 5
Fig. 6
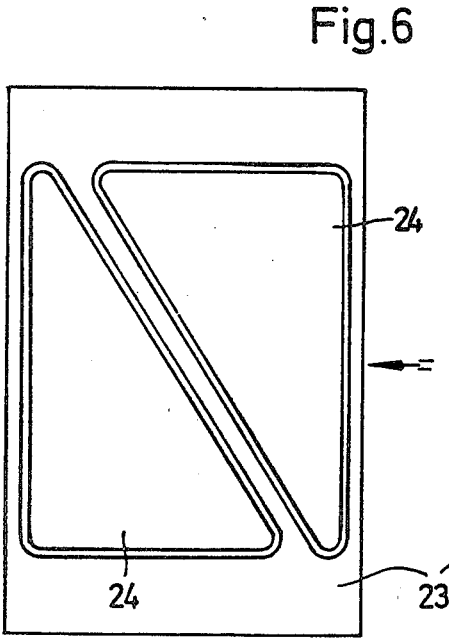
Fig. 7
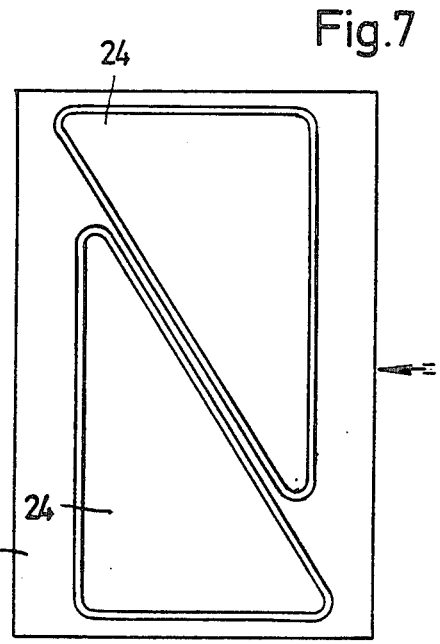

PRESSURE APPLICATION APPARATUS

BACKGROUND OF THE INVENTION

The present invention relates to an apparatus for applying a pressure on the surface of progressively moving workpieces such as wood or chipboard panels. A known type of apparatus has at least one revolving endless pressure application belt which is adapted to be pressed against the workpiece by means of a pressure medium. The pressure medium is located with a pressure chamber on the internal surface of the belt, the chamber being fitted with sealing strips.

In such known devices, there is provided a single pressure chamber located above or below the belt in dependence upon the location of the belt with respect to the workpiece. Such chamber extends over substantially the entire width of the progressively moving workpiece. Such large pressure chambers, which are impacted by a pressure medium such as compressed air, have inherent adverse features. The sealing strips which extend in the direction of movement of the pressure application belt, on the open side of the chamber are subjected to considerably higher stresses than the sealing members at right angles thereto. This leads to different wear characteristics, premature tearing of the strips and loss of air-tightness. The necessarily long sealing strips cannot be made in one integral piece. There are therefore one or more abutment points which also cause air leakage and pressure losses. Considerable forces act on those sections of the sealing strip which extend in the direction of travel of the belt and so these strips must be supported. This, however, necessitates considerable structural expenditure. If there is a sudden considerable drop in pressure in the chamber, the workpiece presses the belt against the internal surfaces of the pressure chambers. Considerable wear occurs if such internal surfaces are not coated with a special low-friction material. These preparations required to give emergency running properties are also expensive, and are difficult to produce.

The present invention seeks to develop such an apparatus in a manner such that the sealing strips do not have abutment points or have joints, do not require costly or complicated supports, and which exhibit good emergency running properties. The present invention seeks to provide an apparatus in which sealing strips are readily interchangeable. Moreover, the present invention seeks to provide an arrangement in which the pressure application is adaptable, in a simple manner, to differing workpiece widths.

In accordance with the present invention, there is provided an apparatus for applying a surface pressure to progressive moving workpieces comprising at least one rotating pressure belt having a workpiece carrying surface and an opposed surface and means for applying pressure to said belt to cause said belt to apply pressure to said workpiece, said pressure application means comprising a sealing strip in sealing abutment with said opposed surface of said belt, said sealing strip together with said belt forming part of a pressure chamber into which a pressure medium is induced the improvement comprising the provision of a plurality of pressure chambers over the length and width of said belt in its workpiece carrying region. Reduction of the size of the pressure chambers inherent in such an arrangement improves the life and the effectiveness of the sealing strips secured to the chambers.

Preferably, said pressure chambers are cylindrical and have a cross-section which is selected from the group consisting of triangular, oval, circular and elongate rectangular with radiused ends. By means of a plurality of such small pressure chambers the sealing problem is solved in a particularly favourable manner. On the one hand such pressure chambers, especially those having a circular cross-section, that is to say, those which are right cylinders are very easy to produce. The circular sealing strips may be produced in a single piece without joints. On account of such shape the sealing member or strip is well supported all around the chamber and premature wear and tear is avoided. Because of the relatively small ring surface area, the surfaces thereof may be machined very precisely. This eliminates any difficulties which may be encountered due to inaccuracies in machining, which difficulties have occurred in known sealing members.

Such small sealing strips are readily interchanged or replaced. Simply by connecting further small pressure chambers into the apparatus effective surface area of the pressing belt acting on the workpiece may be widened or lengthened as desired. Thus, a system of virtually any size can be constructed using the same components. It is further possible to combine the small pressure chambers in rows which are juxtaposed in the direction of travel of the belt and which rows can be impaced separately with a pressure medium. This permits the production of varying pressure forces over the width of the effective surface and, conversely, provides a very simple manner of varying the effective working width of the pressure application surface of the belt.

Desirably, the apparatus additionally comprises a pressure plate, said pressure plate having a recessed wall portion formed therein to define a groove, said groove receiving a frame member, said frame member guiding said sealing member, said sealing member being slidingly engaged by said pressure belt, said frame and said groove in said pressure plate together defining a gap, an elastic sealing member having a first end portion and a second end portion, said first end portion connecting said sealing member to said frame and said second end portion slidingly abutting said recessed wall portion defining said groove. The frame is preferably laterally supported, at its end facing the belt, on a plurality of fixed holding yokes projecting into the region of the groove. Such arrangement ensures that the frame cannot tilt in the groove even if the compressed air contained in the pressure chamber would tend to produce such an effect. The frame may thus be pressed constantly against the belt by the pressure medium whilst still being able to move slightly to and fro within the groove.

BRIEF DESCRIPTION OF THE DRAWINGS

The invention will be further described by way of example, with reference to the accompanying drawings in which:

FIG. 4 is a plan view of a plurality of pressure chambers of elongate rectangular cross-section but with radiused end, each chamber being located on an individual supporting plate extending at right angles to the direction of travel of the workpieces;

FIG. 5 is a plan view of the pressure chambers shown in FIG. 4 but in which the supports have been staggered relative to one another in a direction at right angles to the direction of travel of the workpieces;

FIG. 6 is a plan view of an alternative embodiment in which the pressure chambers are of triangular cross-section;

FIG. 7 is a plan view of the triangular pressure chambers shown in FIG. 6 which are mutually offset to increase the width of the effective pressure surface;

Figure 3:
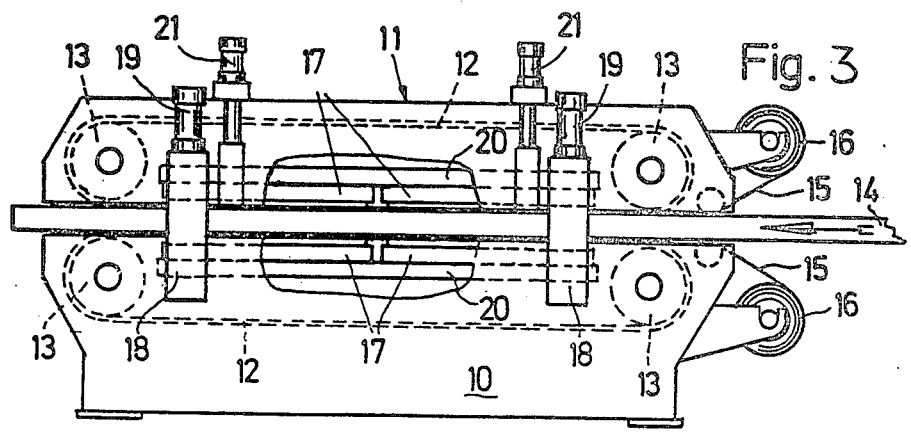
FIG. 3 is a side view, partially in section, of an apparatus having two pressure application belts, cylindrical pressure chambers being located, respectively, above and below such belts.

An apparatus in accordance with the present invention comprises a lower frame 10 and an upper frame 11, best seen in FIG. 3, in which endless pressure application belts 12 are incorporated. The belts 12 pass over guide rollers 13 and are driven thereby. The frames are so arranged that a gap is defined between the adjacent opposing faces of the two belts. The size of the gap is selected in dependence upon the relevant dimension of a workpiece 14 to be treated. Although the surfaces of the belts making contact with the workpiece 14 are moving horizontally, the workpieces 14 are drawn into the apparatus and, in the gap defined between the surfaces of the belts, are subjected to a pressure by the surfaces of the pressing belts 12 when passing through the device. A treated workpiece is discharged at the outlet of the apparatus (not shown).

In the present embodiment, it will be assumed that a foil or sheet 15 is to be applied to each of the upper and lower surfaces of the workpiece 14. The foil is unwound from storage rolls 16. Such a pressing operation may be effected at room temperature but, if desired, heating means (not shown) may be provided for producing high temperatures of the workpiece 14 in the treatment region. To produce the required pressure, the upper frame 11, as a whole, could be pressed against the lower frame 10. However, according to the present invention, the spacing between the upper frame 11 and the lower frame 10 is set approximately and the necessary pressure is applied by means of compressed air. The compressed air is located in pressure chambers 17 which are arranged on the rear (with reference to the workpiece 14) surface of the belt 12, that is to say, the surface of the belt 12 which is not in contact with the workpiece 14.

For approximately setting the spacing between the frames 10 and 11, guide slides 18 are provided which are secured to the lower frame 10 and on which the upper frame 11 is vertically displaceable. To effect such displacement, hydraulic cylinders 19 are provided.

The pressure chambers 17 are partially defined by pressure plates 20 which are displaceably guided relative to the frames 10 and 11, the movement of the plates being produced by hydraulic cylinders 20a.

Figure 1:
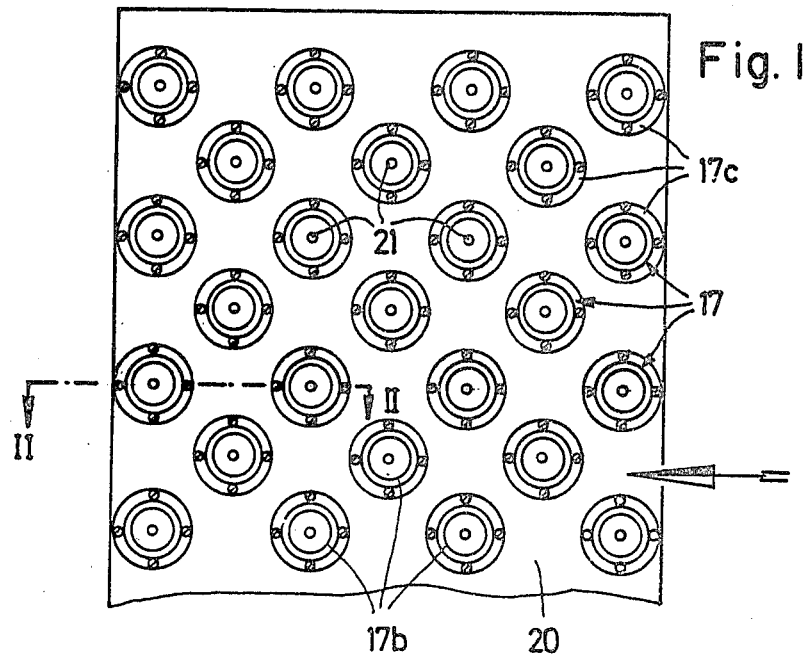
FIG. 1 is a plan view from below of a plurality of cylindrical pressure chambers forming part of a pressure application apparatus in accordance with the present invention.
Figure 2:
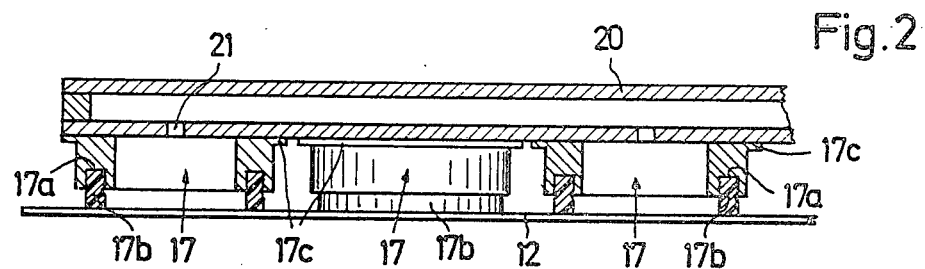
FIG. 2 is a side view, partially in section of three cylindrical pressure chambers as shown in FIG. 1, the section being taken along the line II—II of FIG. 1, the air supply to the cylinders also being shown.

As shown in FIGS. 2 to 3 of the drawings, the individual pressure chambers 17 are substantially cylindrical. Around the periphery of one end of the cylinder, a groove 17a is provided in which annular sealing strips 17b are secured. This groove 17a is machined in the end face of the cylinder. The sealing strips 17b protrude from the groove 17a so as to form a sealing lip, the end face of the strip abutting sealingly against the internal surface of the rotating belt 12. At its end remote from the sealing strip 17b the cylindrical pressure chamber 17 is provided with a ring flange 17c. This flange is secured, by means of screws or the like, to a flat pressure plate 20. The plates 20 have air supply passages 21 extending therethrough, through which compressed air is supplied to individual pressure chambers 17 through suitable supply conduits. The cylindrical pressure chambers 17 are located in rows which extend at right angles to the direction of travel of the pressing belt 12 so that adjacent pressure chambers 17 are offset relative to one another. The staggered arrangement of the pressure chambers 17 means that the air impacts the internal surface of the pressing belt 12 over its entire width and over a desired length.

In FIGS. 4 and 5, there are shown pressure chambers 22 which are basically rectangular in cross-section with radiused end regions. The major axis of each of the chambers 22 extends over a substantial portion of the width of the pressure. In their longitudinal direction, each chamber is displaceably located on a support plate 23, so that the effective pressure length of each chamber may be varied in dependence upon the width of the pressure surface desired to act on the pressure belt 12.

FIGS. 6 and 7 show a further embodiment in which the pressure chambers are referenced 24 and each have a basically triangular cross-section. The triangles are right-angled and are disposed so that the hypotenuses thereof lie adjacent one another and extend obliquely to the direction of the belt 12. These triangular pressure chambers 24 are similar to the chambers 22, displaceable in a direction at right angles to the direction of travel of the belt. The direction of travel of the belt is indicated by an arrow strip in each of FIGS. 4 to 7. By staggering the pressure chambers 24 a greater width of the pressing surface on the pressing belt can be achieved but on the other hand both pressure chambers 24 are narrower. The embodiments shown in FIGS. 4 to 7 have the advantage that the sealing strips extending at right angles to the direction of movement of the pressing belt are longer than those extending in the direction of movement so that the sealing strips which are subjected to the greater stress are shorter.

Figure 8:
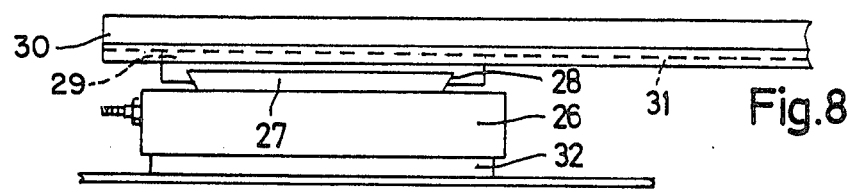
FIG. 8 show a guide device for the pressure chambers, which guide device is secured to a support plate.

In FIG. 8 a support-like guide device for a support plate is shown. Herein, the support plate is referenced 26 and has a dovetail portion 27 which engages in a corresponding groove 28. The groove 28 is, in turn, located in a dovetail portion 29 extending at right angles thereto which engages in a corresponding groove 31 formed in the guide bar 30. Such a guide device makes it possible in favourable manner to displace a support plate 26 having one or more pressure chambers 32 both in the direction of movement of the pressing belt and in a direction at right angles thereto.

Figure 9:
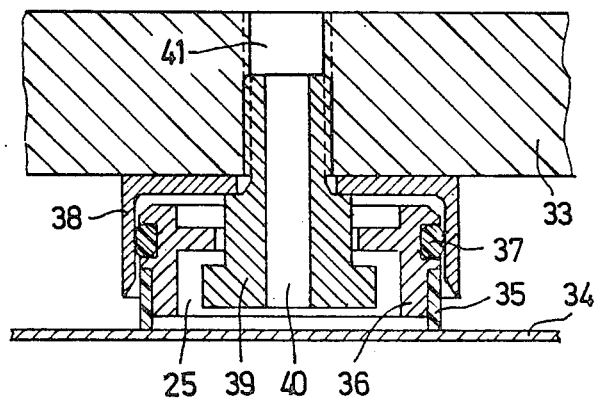
FIG. 9 is a pressure chamber formed from two concentric frames.

FIG. 9 shows a pressure chamber 25 which comprises two concentrical frames 36, 38 and which is located between a pressure plate 33 and a pressure belt 34. The sealing member 35 abutting against the belt 34 is located in a recess formed in the inner frame 36. A resilient sealing member 37 spans the gap between the inner frame 36 and the outer frame 38. The inner frame 36 may thus move slightly, in a friction-free manner, relative to the outer frame 38. The outer frame 38 is connected to the pressure plate 33 by means of a screw-threaded member 39 which has a through bore 40 for permitting the passage of pressure medium therethrough. A tapped bore 41, used as a pressure medium supply passage, is formed in the pressure plate 33 and the bores 40 and 41 concentric with one another. Owing to the pressure medium two forces act against each other, which differ from the force caused by the pressure medium from the ring surface of the sealing member. Because of this difference in force, the inner frame 36 together with the sealing member 35, is constantly pressed towards the pressure belt 34.

Figure 10:
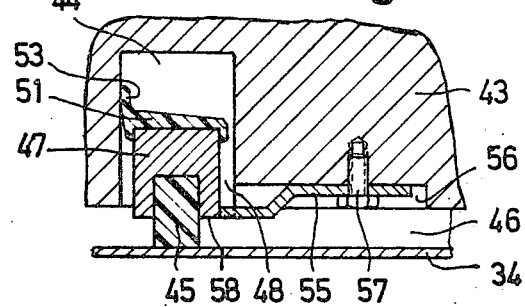
FIG. 10 shows a frame for the belt sealingly located in a groove formed in a pressure plate and including an elastic sealing member.
Figure 11:
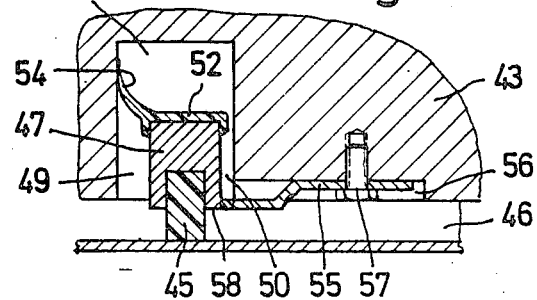
FIG. 11 is an alternative embodiment of the frame and the elastic sealing member shown in FIG. 10.

In the embodiment shown in FIGS. 9, 10 and 11, constant abutment of the sealing member with the pressing band sliding therealong is ensured. Deviations of the pressure belt from its plane of movement are compensated automatically because of the unobstructed movement of the sealing member, and of the frame associated therewith, in a direction vertical to the plane of the pressure belt. The danger of tilting of the frame supporting the sealing member does not, therefore, exist.

The pressure plate 43 shown in FIGS. 10 and 11 has, on its surface facing the pressure belt 34, an annular groove 44 formed therein in which a sealing member 45 is secured. In use, the sealing member 45 abuts against the pressure belt 34. The belt slides along the sealing member. The pressure chamber 46 is therefore defined by the surface of the pressure plate 43, the surface of the pressure belt 34 remote from the workpiece 14 and by the annular sealing member 45. The pressure medium is introduced into the pressure chamber 46 through apertures formed in the pressure plate 43.

The sealing member 45 is retained in the groove 44 by a frame member 47. The frame member 47 has an annular groove formed therein which is open in a direction towards the pressure belt 34. The sealing member 45, which is of rectangualr cross-section, is inserted into this groove. The frame 47 is located within the groove 44 displaceable in a direction at right angles to the pressure belt 34, whilst the sealing member 45 is secured within the frame 47. The width of the frame 47 is less than the width of the groove 44, so that there is a spacing 48 between the groove 44 and the frame 47. In FIG. 10 of the drawings, the frame is shown centrally disposed within the groove, whilst in FIG. 11, the frame is eccentrically disposed and two different spacings 49 and 50 on opposite sides of the frame are shown.

On the surface of the frame 47 which, in use, is parallel to the pressure belt 34 but remote therefrom, a resilient rubber sealing member 51 or 52 is arranged, one edge 53 or 54 respectively of which abuts against a wall of the groove so as to seal off the interior of the groove from the atmosphere. The edge 54 shown in FIG. 11 is longer than the edge 53 shown in FIG. 10. The sealing member 52 in FIG. 11 is thus able to compensate for greater displacements of the frame 47 due to its elastic deformation. During deflection movements of the frame 47, the edge 53 or 54 respectively remains in abutment with the wall of the groove 44 and no sliding friction occurs at this point. In its end region nearest the pressure belt 34, the frame 47 is laterally supported by a plurality of retaining yokes 55 which project into the groove 44 by an amount corresponding to the dimension of the spacing 48 or 50. One end of each retaining yoke is screwed into a recess 56 formed in the pressure plate 43 by means of a bolt 57. Between two successive retaining yokes a spacing is maintained which permits the pressure medium to enter from the pressure chamber 46 through the space 48 or 50 into the interior of the groove 44.

Pressure medium, for example, compressed air, therefore passes through apertures in the pressure plate 43 into the pressure chamber 46 and so builds up a uniform static pressure both in the pressure chamber 46 and in the space of the groove 44 not occupied by the frame 47. This pressure produces a force which presses the sealing member 45 in a vertical direction against the pressure belt 34. This force counteracts a smaller force which is determined by the pressure of the medium in the pressure chamber 46 and the surface portion 58 of the frame 47 facing the pressure belt 34 within the pressure chamber 46. It is therefore sufficient for the pressure of the medium within the chamber 46 to be slightly above atmospheric pressure so as to produce, constantly, a resultant force which presses the sealing member 45 against the pressure belt 34.

During the operation of the apparatus, the frame 47, together with the sealing member 45, is constantly pressed in a direction towards the pressure belt 34 which slides along the sealing member 45 due to the excess pressure prevailing in the chamber 46 and in the groove 44. Deflections of the pressure belt from its plane of contact with the workpiece are readily followed by the sealing member 45 and the frame 47 associated therewith because the friction between the frame 47 and the pressure plate 43 is very small. Between the surface of the frame 47 and the walls of the groove 44 there is no frictionally-opposed movement. The only point at which friction can occur is at the point of contact between retaining yoke 55 and the frame 47. The frame 47 may pivot slightly about this point of contact, so that any tilting in the groove 44 is eliminated.

I claim:

1. An apparatus for applying a surface pressure to progressively moving workpieces comprising:
   a plate member having a working surface;
   a plurality of pressure members secured to said plate member working surface, each pressure member having a peripheral outer frame defining an open ended pressure chamber;
   an inner frame slidably received in each said pressure member outer frame, each inner frame having a peripheral edge;
   a sealing strip affixed to and extending from the peripheral edge of each of said inner frames;
   an endless pressure belt rotating around said plate member, the belt having a workpiece engaging surface and an opposed surface, the sealing strip affixed to each of said pressure chambers slidably engaging the opposed surface of said belt; and
   means of applying a pressure medium to each said pressure chamber to thereby force said belt into pressure contact with moving workpieces.

2. An apparatus as recited in claim 1, wherein said pressure chambers overlap one another across the width of said belt in its workpiece-carrying region.

3. An apparatus as recited in claim 1, wherein said pressure chambers have a cross-section which is triangular.

4. An apparatus as recited in claim 3, wherein said cross-section is triangular, said triangles are right-angled triangles, the triangular pressure chambers being disposed so that the hypotenuses of adjacent pairs of triangles are adjacent one another.

5. An apparatus as recited in claim 1, wherein said pressure chambers are displaceable in a direction at rights angles to the longitudinal direction of movement of said pressure application belt.

6. An apparatus as recited in claim 1, wherein said outer frame and said inner frame jointly define a space, a resilient sealing member spanning said space.

7. An apparatus as recited in claim 1, additionally comprising screw means, said screw means connecting said outer frame to said pressure plate, said screw means extending concentrically to said outer frame and having a centrally disposed bore extending therethrough.

8. An apparatus as in claim 1 wherein said pressure chambers have a cross-section which is oval.

9. An apparatus as in claim 1 wherein said pressure chambers have a cross-section which is circular.

10. An apparatus as in claim 1 wherein said pressure chambers have a cross-section which is elongated rectangular with radiused ends.

* * * * *